United States Patent
Zhang et al.

(10) Patent No.: US 11,716,184 B2
(45) Date of Patent: Aug. 1, 2023

(54) TRANSMITTING CHANNEL STATE INFORMATION REFERENCE SIGNALS IN NEW RADIO

(71) Applicant: QUALCOMM INCORPORATED, San Diego, CA (US)

(72) Inventors: Yu Zhang, Beijing (CN); Alexandros Manolakos, San Diego, CA (US); Tao Luo, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 16/466,697

(22) PCT Filed: Dec. 2, 2017

(86) PCT No.: PCT/CN2017/114342
§ 371 (c)(1),
(2) Date: Jun. 5, 2019

(87) PCT Pub. No.: WO2018/099481
PCT Pub. Date: Jun. 7, 2018

(65) Prior Publication Data
US 2019/0342042 A1  Nov. 7, 2019

(30) Foreign Application Priority Data
Dec. 2, 2016 (WO) ................ PCT/CN2016/108346

(51) Int. Cl.
*H04L 5/00* (2006.01)
*H04L 1/18* (2006.01)

(52) U.S. Cl.
CPC ................ *H04L 5/005* (2013.01); *H04L 1/18* (2013.01); *H04L 5/0007* (2013.01)

(58) Field of Classification Search
CPC ......... H04L 5/005; H04L 1/18; H04L 5/0007; H04L 5/0094; H04L 5/0057;
(Continued)

(56) References Cited

U.S. PATENT DOCUMENTS 8,675,589 B2   3/2014   Ko et al.
9,872,242 B2   1/2018   Xiao et al.
(Continued)

FOREIGN PATENT DOCUMENTS

CN   101924610 A   12/2010
CN   102687421 A    9/2012
(Continued)

OTHER PUBLICATIONS

R1-1612367, AT&T, CSI-RS Design for Mixed Numerology Support in NR, Nov. 2016, 3GPP TSG-RAN WG1 #87 (Year: 2016).*
(Continued)

*Primary Examiner* — Phong La
(74) *Attorney, Agent, or Firm* — Qualcomm Incorporated

(57) ABSTRACT

Certain aspects of the present disclosure provide techniques for transmitting and processing channel state information (CSI) reference signals (CSI-RS). An exemplary method includes determining a configuration of channel state information reference signals (CSI-RSs), wherein the configuration indicates a set of resource elements (REs) to be used for CSI-RSs and a first mapping of CSI-RS ports to the set of REs; sending an indication of the configuration of the CSI-RSs; and transmitting the CSI-RSs according to the determined configuration.

29 Claims, 16 Drawing Sheets

(58) Field of Classification Search
CPC ....... H04L 5/0016; H04L 1/06; H04L 5/0051; H04L 5/0048; H04L 5/0053; H04L 5/0005; H04L 1/1607; H04B 7/0623; H04B 7/0626

See application file for complete search history.

(56) References Cited

U.S. PATENT DOCUMENTS

| | | | |
|---|---|---|---|
| 2011/0176634 | A1 | 7/2011 | Yoon et al. |
| 2011/0292847 | A1 | 12/2011 | Yoon et al. |
| 2011/0310825 | A1* | 12/2011 | Hu .................. H04L 25/0232 370/329 |
| 2014/0211730 | A1* | 7/2014 | Seo .................. H04L 5/0053 370/329 |
| 2016/0050617 | A1* | 2/2016 | Hwang .............. H04L 5/0053 455/434 |
| 2016/0094326 | A1 | 3/2016 | Moon et al. |
| 2016/0248562 | A1 | 8/2016 | Nam et al. |
| 2016/0301493 | A1 | 10/2016 | Cao et al. |
| 2016/0337178 | A1* | 11/2016 | Frenne ............... H04L 5/0048 |
| 2016/0352482 | A1 | 12/2016 | Sun et al. |
| 2018/0278437 | A1* | 9/2018 | Davydov ............ H04B 7/0456 |
| 2019/0007931 | A1* | 1/2019 | Harada .............. H04W 72/04 |
| 2019/0109686 | A1* | 4/2019 | Jiang ................. H04L 5/0007 |
| 2019/0200347 | A1* | 6/2019 | Ryu ................. H04W 72/0413 |
| 2019/0372641 | A1* | 12/2019 | Muruganathan ..... H04B 7/0626 |
| 2020/0007287 | A1* | 1/2020 | Kakishima ............ H04J 13/16 |

FOREIGN PATENT DOCUMENTS

| | | | | |
|---|---|---|---|---|
| CN | 102804625 | * | 11/2012 | ......... H04L 5/0026 |
| CN | 102804625 | A | 11/2012 | |
| CN | 102869105 | A | 1/2013 | |
| CN | 103037397 | A | 4/2013 | |
| CN | 103841632 | A | 6/2014 | |
| CN | 104038320 | A | 9/2014 | |
| CN | 104541460 | A | 4/2015 | |
| CN | 104938006 | A | 9/2015 | |
| CN | 105075319 | A | 11/2015 | |
| CN | 106160826 | A | 11/2016 | |
| EP | 2763339 | A1 | 8/2014 | |
| WO | WO-2011152651 | A2 | 12/2011 | |
| WO | 2013024991 | A2 | 2/2013 | |
| WO | WO-2015116619 | A1 | 8/2015 | |

OTHER PUBLICATIONS

International Search Report and Written Opinion for PCT/CN2017/114342, dated Feb. 24, 2018.

AT&T, CSI-RS Design for Mixed Numerology Support in NR, 3GPP TSG-RAN WGl #87, RI-1612367 (Nov. 13, 2016. Section, 2.1, Fig. 2-1.

International Search Report and Written Opinion—PCT/CN2016/108346—ISA/EPO—dated Aug. 28, 2017.

Ericsson: "On CSI-RS design", 3GPP Draft, 3GPP TSG-RAN WG1 #87ah-NR, R1-1700766 on CSI-RS Design, 3rd Generation Partnership Project (3GPP), Mobile Competence Centre, 650, Route Des Lucioles, F-06921 Sophia-Antipolis Cedex, France, vol. RAN WG1, No. Spokane, WA, USA, Jan. 16, 2017-Jan. 20, 2017 Jan. 10, 2017 (Jan. 10, 2017), XP051203084, 8 Pages, Retrieved from the Internet: URL:http://www.3gpp.org/ftp/tsg_ran/WG1_RL1/TSGR1_AH/NR_AH_1701/Docs/ [retrieved on-Jan. 10, 2017].

Nokia et al., "CSI-RS Design Supporting up to 32 Antenna Ports", 3GPP Draft, 3GPP TSG-RAN WG1 Meeting #84bis, R1-162806 CSI-RS Design Supporting Up to 32 Antenna Ports_Final, 3rd Generation Partnership Project (3GPP), Mobile Competence Centre, 650, Route Des Lucioles, F-06921 Sophia-Antipolis C, vol. RAN WG1, No. Busan, Korea, Apr. 11, 2016-Apr. 15, 2016 Apr. 1, 2016 (Apr. 1, 2016), XP051079849, 4 Pages, Retrieved from the Internet: URL:https://www.3gpp.org/ftp/tsg_ran/WG1_RL1/TSGR1_84b/Docs/ [retrieved on Apr. 1, 2016].

Supplementary European Search Report—EP17876739—Search Authority—The Hague—dated Jun. 9, 2020.

Huawei, et al., "DL CSI-RS Design for NR CSI Acquisition", 3GPP TSG RAN WG1 Meeting #87, R1-1611241, Reno, USA, Nov. 14-18, 2016, 7 Pages, Nov. 5, 2016, Internet URL: http://www.3gpp.org/ftp/tsg_ran/WG1_RL1/TSGR1_87/Docs/R1-1611241.zip.

Ericsson: "CSI-RS Design for Class A FD-MIMO", 3GPP Draft, 3GPP TSG-RAN WG1#82bis, R1-155675, Malmö, Sweden, Oct. 5-9, 2015, 8 Pages.

Lin, L.,"Simulation Research of Pilot Frequency Design and MIMIO Technology in LTE/LTE-Advanced" Communication and Information Systems, Jan. 1, 2011 (Sep. 30, 2011), Full-text Database of China Excellent Master's Thesis, Information Technology Series, pp. 1-116.

3GPP TS 36.211: 3rd Generation Partnership Project, Technical Specification Group Radio Access Network, Evolved Universal Terrestrial Radio Access (E-UTRA), Physical Channels and Modulation (Release 14), 3GPP Standard, 3rd Generation Partnership Project, Mobile Competence Centre, 650, Route Des Lucioles, F-06921 Sophia-Antipolis Cedex, France, vol. RAN WG1, No. V14.0.0, (Sep. 2016), Sep. 29, 2016, pp. 1-170, Nov. 5, 2016.

Huawei et al., "Discussion on Time Domain Structures", 3GPP TSG RAN WG1 Meeting #86bis, R1-1608836, Lisbon, Portugal, Oct. 10-14, 2016, 3GPP Server Release Date (Oct. 1, 2016), 4 Pages.

* cited by examiner

TRANSMITTING CHANNEL STATE INFORMATION REFERENCE SIGNALS IN NEW RADIO

CROSS-REFERENCE TO RELATED APPLICATION

The present Application for Patent is a national stage application under 35 U.S.C. 371 of PCT/CN2017/114342, filed Dec. 2, 2017, which claims priority to International Application No. PCT/CN2016/108346, filed Dec. 2, 2016, which are both assigned to the assignee of the present application and expressly incorporated by reference in their entireties.

INTRODUCTION

Aspects of the present disclosure related generally to wireless communications systems, and more particularly, to transmitting channel state information (CSI) reference signals (CSI-RSs) in a new radio (NR) wireless network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure provide a method for wireless communications. The method generally includes determining a configuration of channel state information reference signals (CSI-RSs), wherein the configuration indicates a set of resource elements (REs) to be used for CSI-RSs and a first mapping of CSI-RS ports to the set of REs, sending an indication of the configuration of the CSI-RSs, and transmitting the CSI-RSs according to the determined configuration.

Aspects of the present disclosure provide a method for wireless communications by a receiver. The method generally includes receiving an indication of a configuration of channel state information reference signals (CSI-RSs) from a transmission reception point (TRP), wherein the configuration indicates a set of resource elements (REs) to be used for CSI-RSs and a first mapping of CSI-RS ports to the set of REs, processing CSI-RSs according to the configuration to determine channel state information, and reporting the channel state information to the TRP.

Aspects of the present disclosure provide an apparatus for wireless communications. The apparatus generally includes means for determining a configuration of channel state information reference signals (CSI-RSs), wherein the configuration indicates a set of resource elements (REs) to be used for CSI-RSs and a first mapping of CSI-RS ports to the set of REs, means for sending an indication of the configuration of the CSI-RSs, and means for transmitting the CSI-RSs according to the determined configuration.

Aspects of the present disclosure provide an apparatus for wireless communications. The apparatus generally includes means for receiving an indication of a configuration of channel state information reference signals (CSI-RSs) from a transmission reception point (TRP), wherein the configuration indicates a set of resource elements (REs) to be used for CSI-RSs and a first mapping of CSI-RS ports to the set of REs, means for processing CSI-RSs according to the configuration to determine channel state information, and means for reporting the channel state information to the TRP.

Aspects of the present disclosure provide an apparatus for wireless communications. The apparatus generally includes a processor configured to determine a configuration of channel state information reference signals (CSI-RSs), wherein the configuration indicates a set of resource elements (REs) to be used for CSI-RSs and a first mapping of CSI-RS ports to the set of REs, to send an indication of the configuration of the CSI-RSs, and to transmit the CSI-RSs according to the determined configuration, and a memory coupled with the processor.

Aspects of the present disclosure provide an apparatus for wireless communications. The apparatus generally includes a processor configured to receive an indication of a configuration of channel state information reference signals (CSI-RSs) from a transmission reception point (TRP), wherein the configuration indicates a set of resource elements (REs) to be used for CSI-RSs and a first mapping of CSI-RS ports to the set of REs, to process CSI-RSs according to the configuration to determine channel state information, and to report the channel state information to the TRP, and a memory coupled with the processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
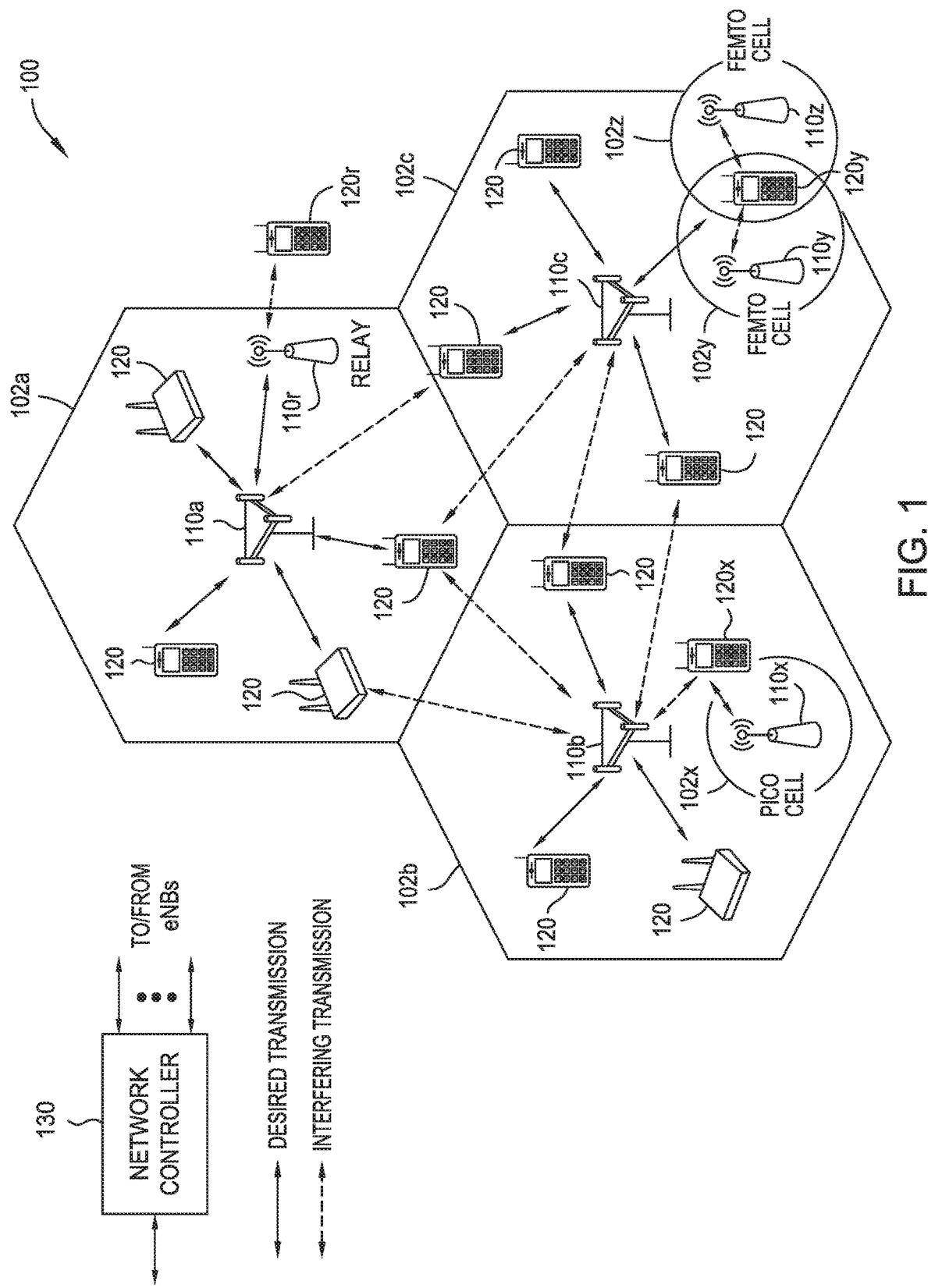
FIG. 1 is a block diagram conceptually illustrating an example telecommunications system, according to aspects of the present disclosure.

Aspects of the present disclosure provide apparatus, methods, processing systems, and computer program products for new radio (NR) (new radio access technology) cell measurement. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be new radio or 5G network. UEs 120 may be configured to perform the operations 900 discussed in more detail below for processing CSI-RS, in accordance with aspects of the present disclosure. Node B 110 may comprise a transmission reception point (TRP) configured to perform the operations 800 discussed in more detail below for transmitting CSI-RS, in accordance with aspects of the present disclosure. The NR network may include the central unit. The new radio network 100 may comprise a central unit 140. According to certain aspects, the UEs 120, Node B 110 (TRP), and central unit 140 may be configured to perform operations related to measurement configuration, measurement reference signal transmission, monitoring, detection, measurement, and measurement reporting, which are described in greater detail below.

The system illustrated in FIG. 1 may be, for example, a long term evolution (LTE) network. The wireless network 100 may include a number of Node Bs (e.g., evolved NodeBs (eNB), 5G Node B, etc.) 110 and other network entities. A Node B may be a station that communicates with the UEs and may also be referred to as a base station, an access point, etc. A Node B and 5G Node B are other examples of stations that communicate with the UEs.

Each Node B 110 may provide communication coverage for a particular geographic area. In 3GPP, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. Each radio frame may be 10 ms long and consist of 50 slots. Consequently, each slot may have a length of 0.2 ms. In alternative embodiments, each slot may have a length of 0.5 ms. In NR, "slots" may also refer to "mini-slots," which may be one to two symbol periods long. Each slot may indicate a link direction (i.e., DL or UL) for data transmission and the link direction for each slot may be dynamically switched. Each slot may include DL and/or UL data as well as DL and/or UL control data. Beamforming may be supported and beam direction(s) may be dynamically configured. MIMO transmissions with precoding may also be supported. Alternatively, NR may support a different air interface, other than an OFDM-based interface. NR networks may include entities such as central units, distributed units, data nodes, access nodes, and access control nodes.

Figure 2:
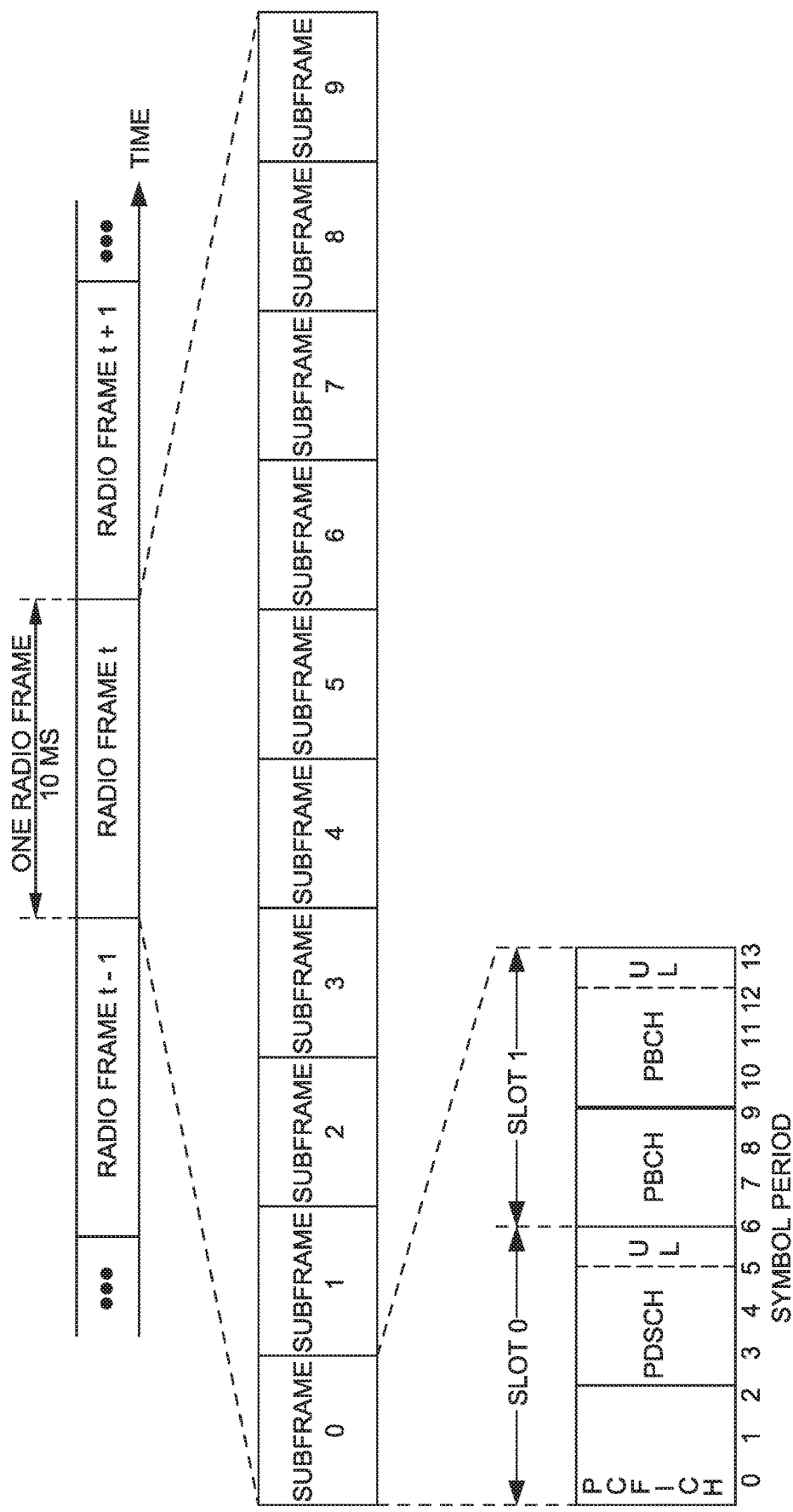
FIG. 2 is a block diagram conceptually illustrating an example downlink frame structure in a telecommunications system, according to aspects of the present disclosure.

FIG. 2 shows an exemplary downlink (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 20 slots with indices of 0 through 19. Each slot may include L symbol periods, e.g., 7 symbol periods for a normal cyclic prefix (as shown in FIG. 2). The available time frequency resources may be partitioned into resource blocks. Each resource block may cover N subcarriers (e.g., 12 subcarriers) in one slot.

The Node B may send a downlink control channel (e.g., a physical downlink control channel (PDCCH)) in the first M symbol periods of each slot (M=3 in FIG. 2). The downlink control channel may carry information on uplink and downlink resource allocation for UEs and power control information for uplink channels. The Node B may send a physical downlink shared channel (PDSCH) in the remaining symbol periods of each slot. The PDSCH may carry data for UEs scheduled for data transmission on the downlink. There may also be an uplink burst at the end of the slot.

The Node B may send the PDCCH to groups of UEs or in a unicast manner to specific UEs in certain portions of the system bandwidth. The Node B may send the PDSCH in a unicast manner to specific UEs in specific portions of the system bandwidth.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
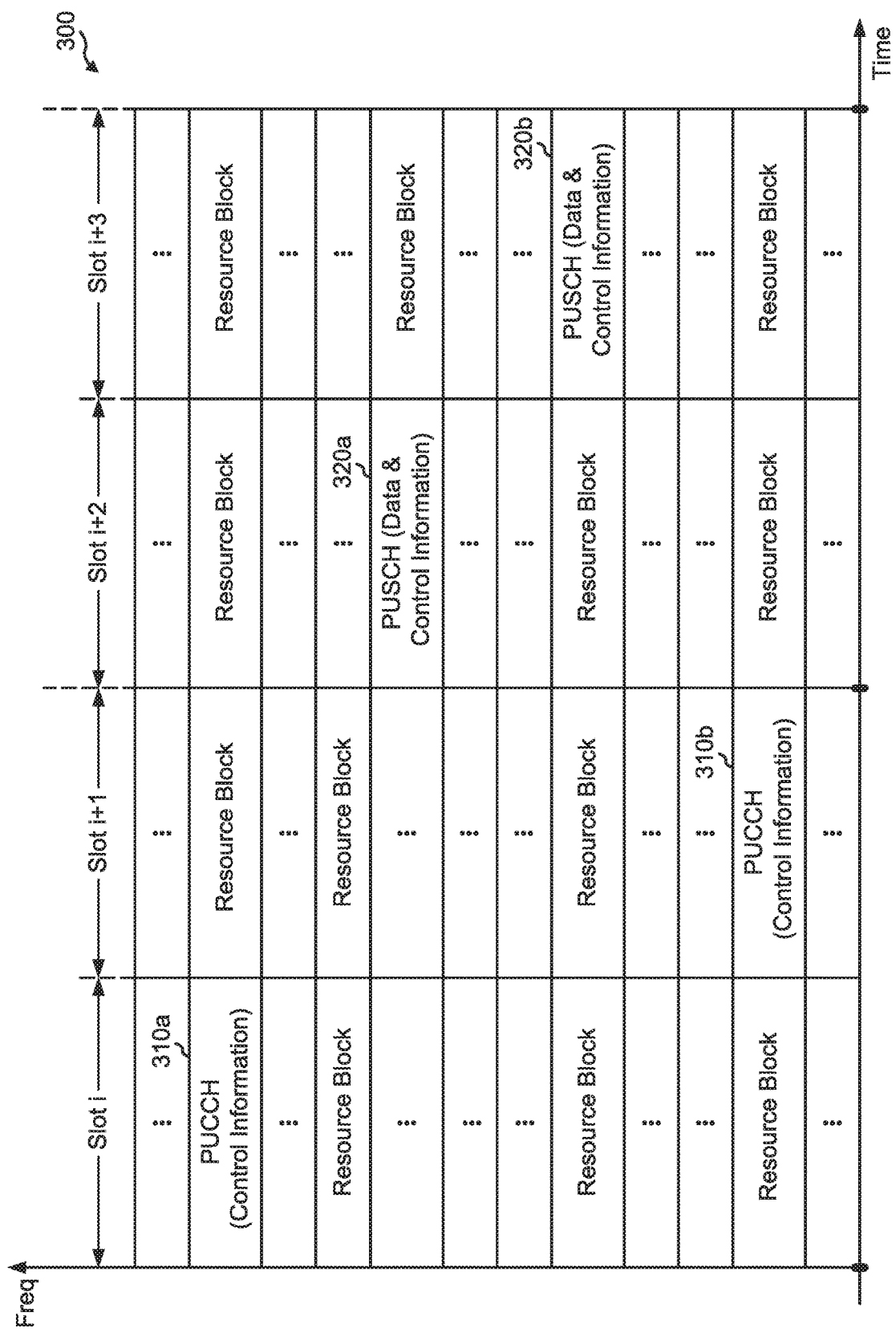
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b to transmit control information to a Node B. The UE may also be assigned resource blocks 320a, 320b to transmit data to the Node B. The UE may transmit control information in a physical UL control channel (PUCCH) on the assigned resource blocks. The UE may transmit only data or both data and control information in a physical UL shared channel (PUSCH) on the assigned resource blocks in the data section. A UL transmission may hop across frequency.

Figure 4:
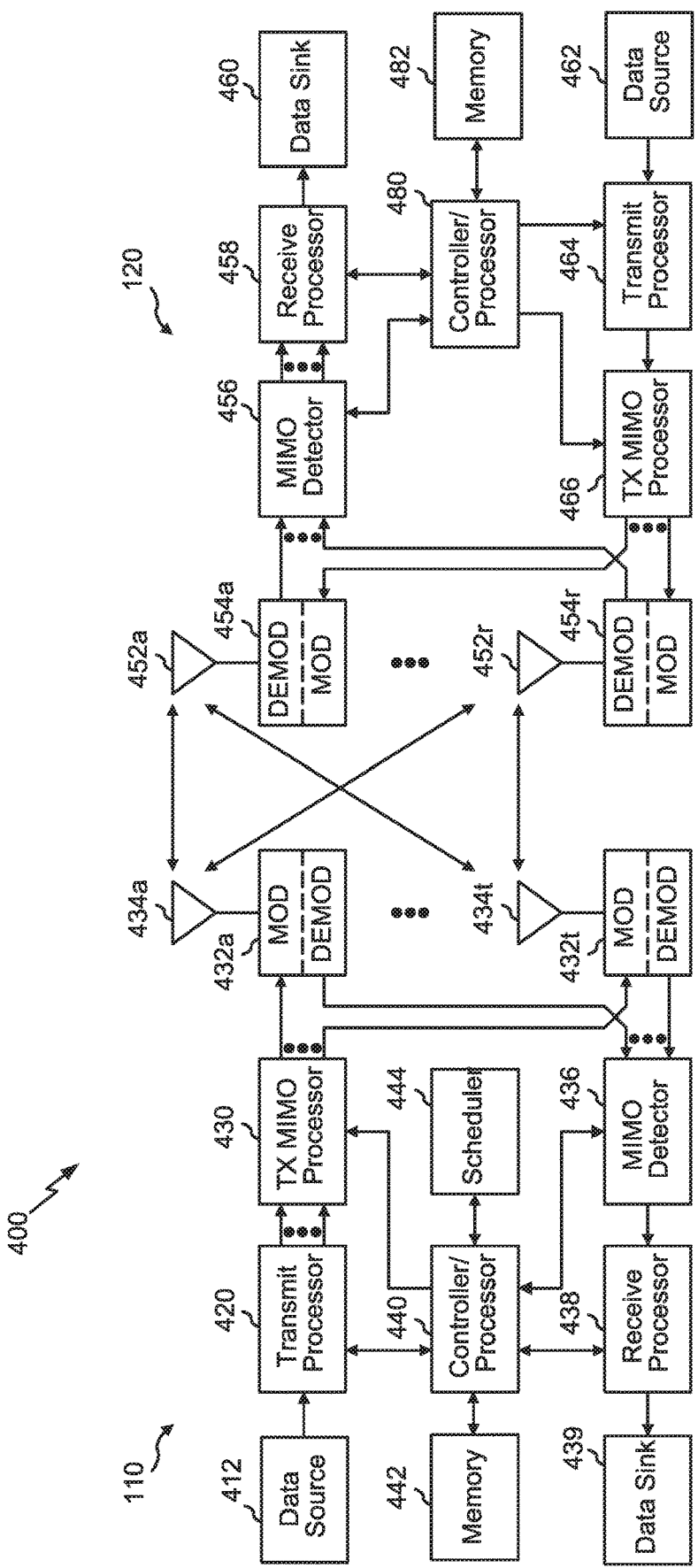
FIG. 4 is a block diagram conceptually illustrating a design of an example Node B and user equipment (UE), according to aspects of the present disclosure.

FIG. 4 illustrates example components of the base station/Node B 110 and UE 120 illustrated in FIG. 1, which may be used to implement aspects of the present disclosure. One or more components of the AP 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 7-8.

FIG. 4 shows a block diagram of a design of a base station/Node B 110 and a UE 120, which may be one of the base stations/Node Bs and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 12-14, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
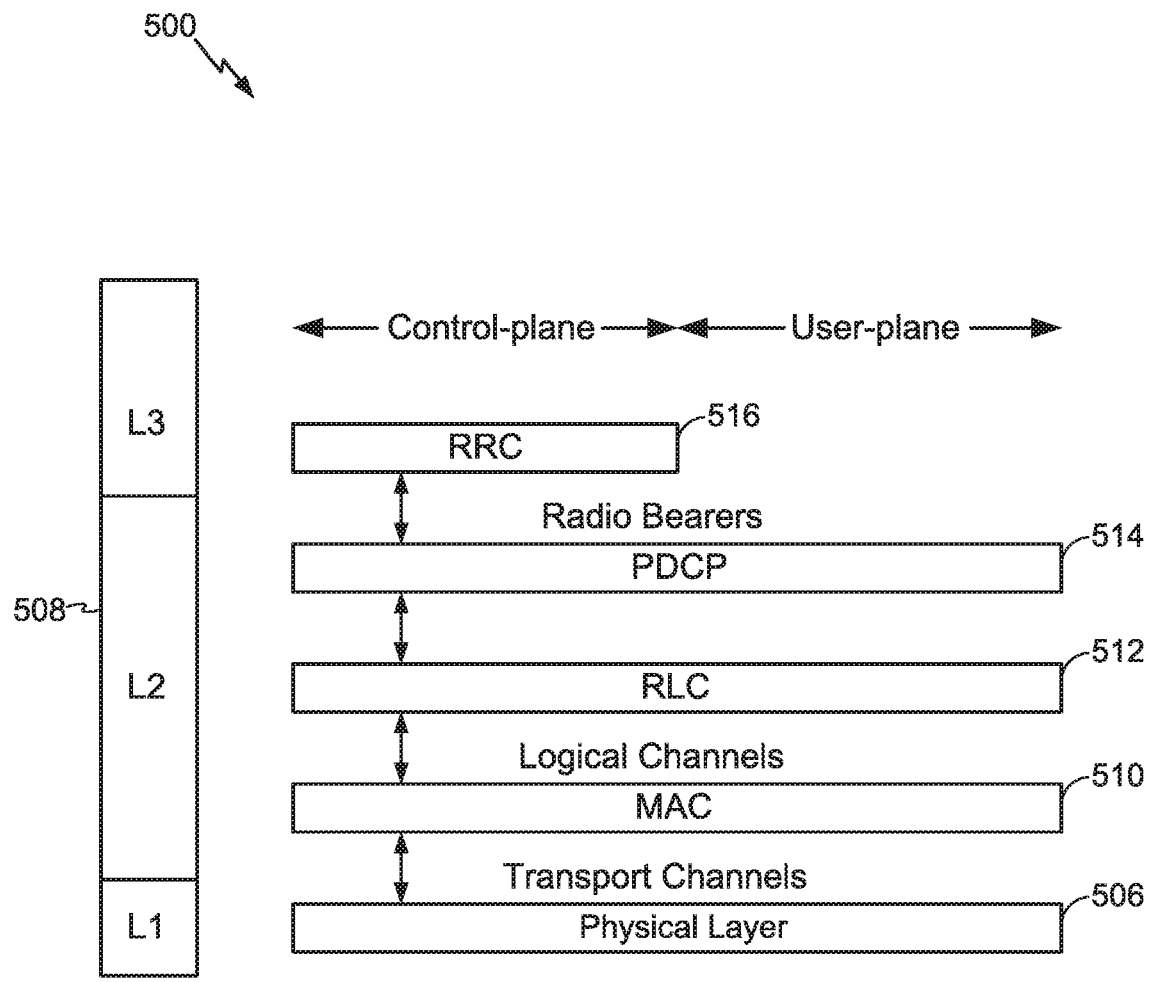
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and Node B over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the Node B on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and Node B is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

New radio (NR) may refer to radios configured to operate according a wireless standard, such as 5G (e.g. wireless network 100). NR may include Enhanced mobile broadband (eMBB) targeting wide bandwidth (e.g. 80 MHz and beyond), millimeter wave (mmW) targeting high carrier frequency (e.g. 27 GHz and higher), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission and reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., central unit 140). The CU may be an Access node controller (ANC). The CU terminates backhaul interface to a RAN core network (RAN-CN) and terminates backhaul interface to one or more neighbor RAN nodes. The RAN may include a distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission) transmit to UEs, and may serve traffic to the UE.

Figure 6:
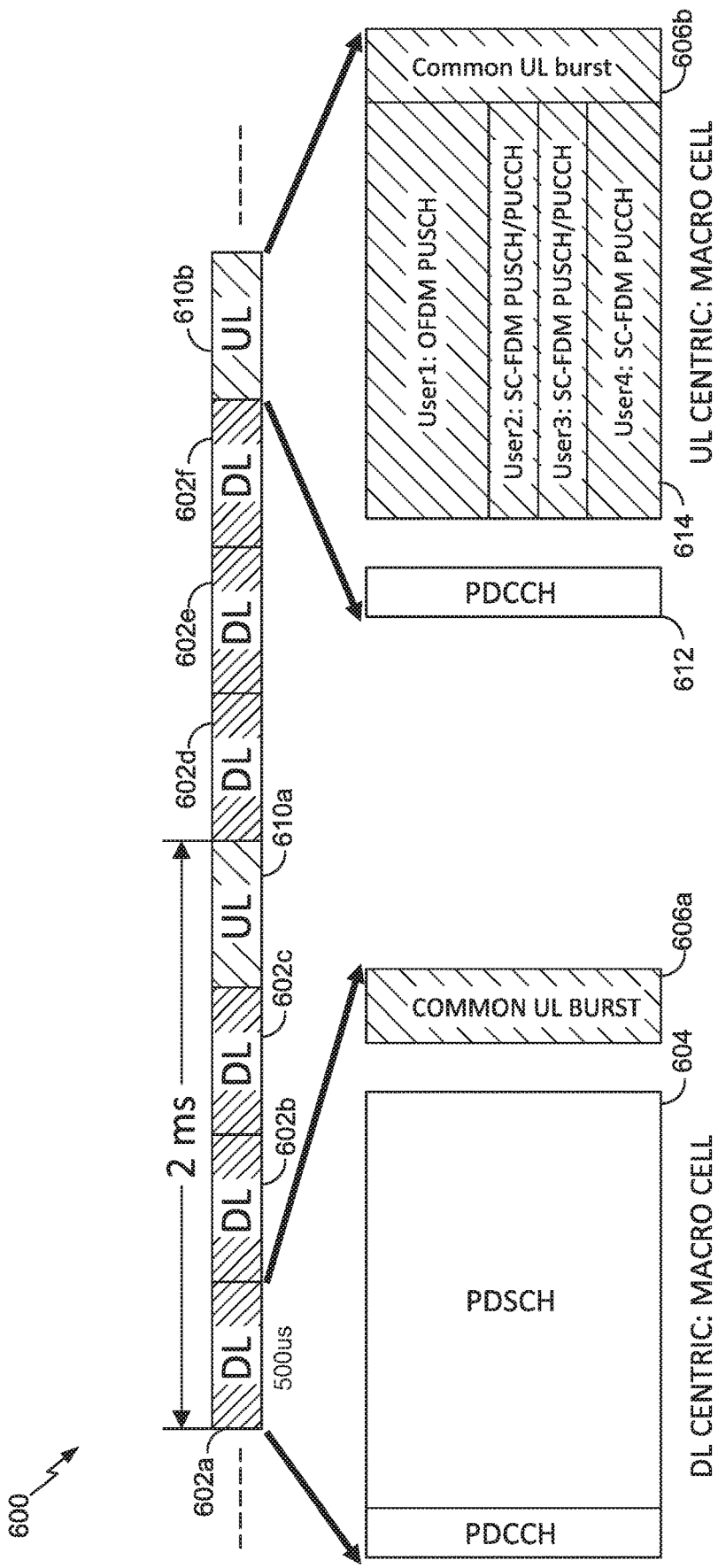
FIG. 6 illustrates an exemplary transmission timeline, according to aspects of the present disclosure.

FIG. 6 shows another exemplary transmission timeline 600 that may be used in a TDD system in which one or more aspects of the present disclosure may be practiced. The timeline 600 is divided into a plurality of slots 602 or 610. A slot is a scheduling unit that has DL control, data, and UL control, as shown. A mini-slot is the smaller scheduling unit that 5G will support. A mini-slot can be as small as 1 or 2 OFDM symbols and can have DL control, data, and UL control. According to aspects of the present disclosure, slots in a TDD communications system may be UL-centric or DL-centric. An UL-centric slot is a slot with a majority of OFDM symbols of the slot used for UL transmission(s). An UL-centric slot typically has a few (e.g. 2) DL symbols at the beginning, then a guard duration, then UL symbols. A DL-centric slot is a slot with a majority of OFDM symbols used for DL transmission. A DL-centric slot typically has most (e.g. 12) of the first symbols used for DL transmissions, then a guard interval, then a few (e.g., 1-2) UL symbols. The timeline 600 includes a plurality DL-centric slots 602 that have most symbols 604 dedicated to DL transmissions (e.g., from a BS to a UE) and a common UL burst 606 at the end with very limited resources dedicated to UL transmissions (e.g., from a UE to a BS). The timeline also includes a plurality of UL-centric slots 610 that each has a DL symbol 612 at the beginning of the slot, but the remaining symbols 614 of the slot are dedicated to UL transmissions. As seen in the UL slot 610*b*, the UL symbols 614 may be allocated to various users (e.g., UEs) for a variety of UL transmissions (e.g., OFDM PUSCH, SC-FDM PUSCH, SC-FDM PUCCH, OFDM PUCCH). Similarly, while not shown, the DL symbols 604 of a DL slot 602 may be allocated for a variety of DL transmissions (e.g., PDCCH, PDSCH) to one or more UEs.

According to aspects of the present disclosure, DL-centric slots and UL-centric slots may occur according to a ratio configurable by the network (e.g., a network controller). The ratio of DL-centric slots and UL-centric slots may be of the order of 4:1, 10:1, etc., i.e., there may be significantly more DL-centric slots than UL-centric slots in many wireless communications systems.

Example of Transmitting Channel State Information Reference Signals in New Radio MIMO may be an important technology enabler for satisfying NR coverage and capacity requirements. The advantages of using MIMO come at the price of obtaining channel state information (CSI) at the transmission/reception point (TRP). The CSI has to be obtained at the TRP via UE feedback based on DL channel estimation by the UE(s), aided by CSI-RS transmitted by the TRP and processed by the UE(s).

Figure 7:
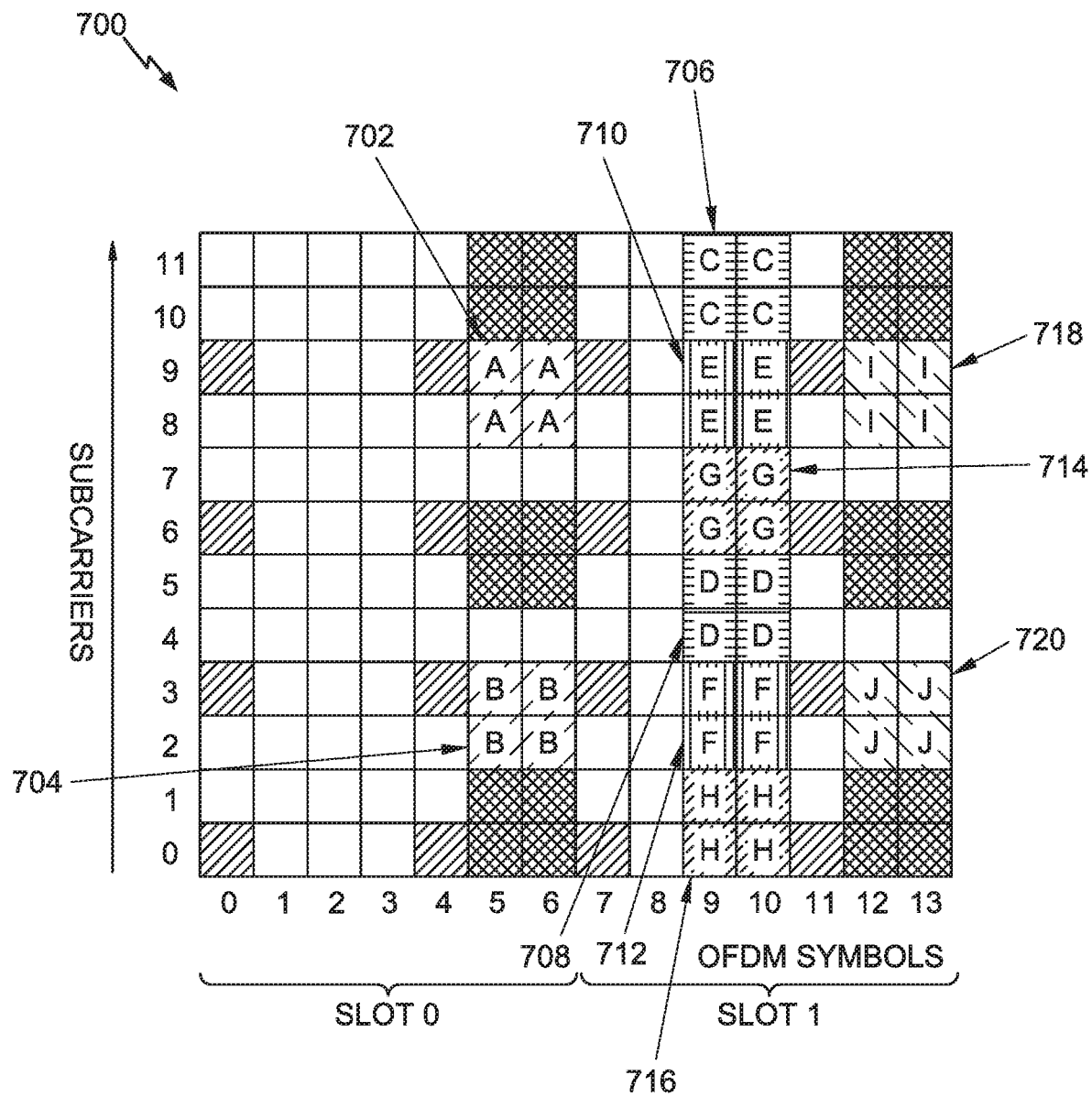
FIG. 7 illustrates an exemplary resource block structure, according to aspects of the present disclosure.

FIG. 7 illustrates an exemplary resource block structure 700 showing a mapping of CSI-RSs to resource elements in an LTE communications system, according to aspects of the present disclosure. In an LTE communications system, up to 40 resource elements (REs) may be reserved for CSI-RS transmission in FDD. The 40 REs that may be reserved for CSI-RS transmission are shown at 702, 704, 706, 708, 710, 712, 714, 716, 718, and 720 labeled as sets A through J of REs, with 4 REs per set. Sets A through J are capable of supporting 10 CSI-RSs, as shown in FIG. 7. If a cell transmits CSI-RS using 2 CSI-RS ports, then the 2 CSI-RS ports may be multiplexed by size-2 orthogonal cover codes (OCC) in the time domain. If a cell transmits CSI-RS using 4 CSI-RS ports, then the 4 CSI-RS ports may be multiplexed by applying size-4 OCC in both the time and the frequency domain. Orthogonal cover codes (OCC) provide additional orthogonality between the CSI-RS ports.

According to aspects of the present disclosure, an NR TRP may determine a configuration of CSI-RSs in resource elements, transmit an indication of the determined configuration, and transmit the CSI-RSs according to the configuration. A UE may obtain the indication of the determined configuration, process CSI-RSs based on the indicated configuration to determine channel state information, and report the channel state information to the TRP. Operation of a massive MIMO wireless communication system heavily relies on a variety of procedures and mechanisms to provide channel state information (CSI) at the transmitter for achieving high beamforming and spatial multiplexing gains. The TRP receiving the CSI may then use the CSI for downlink scheduling by a BS.

According to aspects of the present disclosure, the provided techniques for mapping CSI-RSs to REs may support at least 32 ports while using a smaller footprint, in terms of transmission resources, than other techniques.

According to aspects of the present disclosure, the provided techniques for mapping CSI-RSs to REs may support both beamformed and non-precoded CSI-RS. Power boosting of CSI-RS may improve coverage for UEs in poor coverage conditions.

According to aspects of the present disclosure, the provided techniques for mapping CSI-RSs to REs may support both 7-symbol-period and 14-symbol-period slots, as well as mini-slots having a length in symbol periods from one to a slot-length minus one (e.g., 7−1=6 symbol period mini-slot or 14−1=13 symbol period mini-slot).

According to aspects of the present disclosure, the provided techniques for mapping CSI-RSs to REs may support CSI-RS resource pooling.

According to aspects of the present disclosure, the provided techniques for mapping CSI-RSs to REs may support transmissions using self-contained slots. A self-contained slot is a slot in which a TRP transmits a control channel scheduling an UL transmission (e.g., a PUSCH) or a DL transmission (e.g., a PDSCH) in the same slot. The data transmission occurs in the same slot, and if the data transmission was a DL transmission, then a UE that received the DL transmission transmits an acknowledgment (ACK) in the same slot. This is referred to as a self-contained slot because the TRP starts a transmission (e.g., the PDCCH) in a slot and receives an indication that the transmission was successful (e.g., the PUSCH or the ACK) in the same slot.

Figure 8:
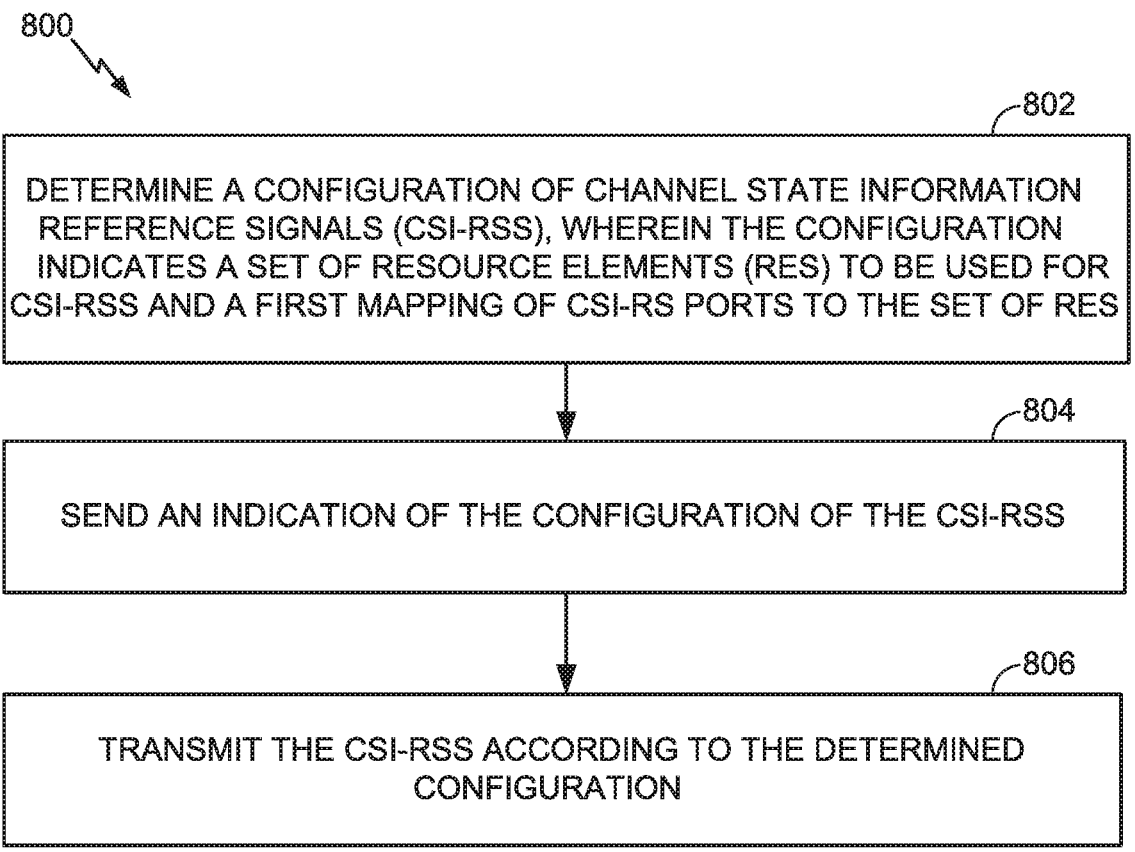
FIG. 8 illustrates example operations for wireless communications by a base station TRP, according to aspects of the present disclosure.

FIG. 8 illustrates example operations 800 for wireless communications by a TRP, according to aspects of the present disclosure. The operations 800 may be performed, for example, by BS 110 shown in FIG. 1.

Operations 800 begin, at block 802 by determining a configuration of channel state information reference signals (CSI-RSs), wherein the configuration indicates a set of resource elements (REs) to be used for CSI-RSs and a first mapping of CSI-RS ports to the set of REs. For example, BS 110 determines a configuration of CSI-RSs (e.g., the configuration illustrated in FIG. 10, described below), wherein the configuration indicates a set of REs to be used for CSI-RSs and a first mapping (e.g., the mapping shown in FIG. 10) of CSI-RS ports to the set of REs.

At block 804, operations 800 continue with sending an indication of the configuration of the CSI-RSs. Continuing the example from above, BS 110 sends (e.g., transmits) an indication (e.g., via radio resource control (RRC), layer 2 (L2), and/or layer 1 (L1) signaling) of the configuration of the CSI-RSs.

Operations 800 continue, at block 806, with transmitting the CSI-RSs according to the determined configuration. Continuing the example from above, BS 110 transmits the CSI-RSs according to the configuration determined in block 802 (e.g., the configuration illustrated in FIG. 10, described below).

Figure 9:
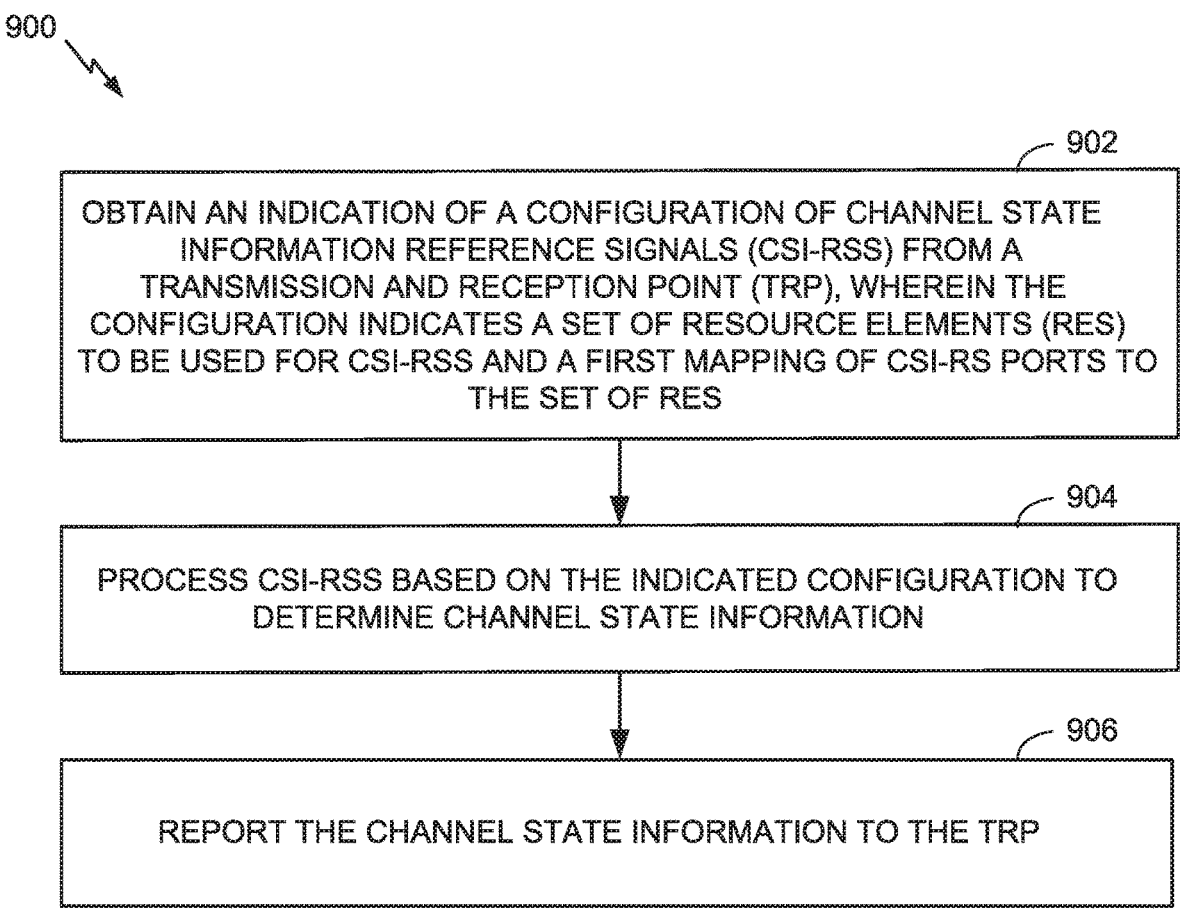
FIG. 9 illustrates example operations for wireless communications by a wireless node, according to aspects of the present disclosure.

FIG. 9 is a flowchart illustrating example operations 900 for wireless communications by a wireless node, according to aspects of the present disclosure. The operations 900 may be performed by, for example, a UE (e.g., UE 120). Operations 900 may be considered UE-side operations performed to process CSI-RS transmitted in accordance with operations 800 described above.

Operations 900 begin, at block 902, by the wireless node obtaining an indication of a configuration of channel state information reference signals (CSI-RSs) from a transmission and reception point (TRP), wherein the configuration indicates a set of resource elements (REs) to be used for CSI-RSs and a first mapping of CSI-RS ports to the set of REs. For example, UE 120, shown in FIG. 1, obtains (e.g., receives via RRC, L2, and/or L1 signaling) an indication of a configuration (e.g., the configuration illustrated in FIG. 10) from a TRP (e.g., BS 110a, shown in FIG. 1), wherein the configuration indicates a set of REs to be used for CSI-RSs and a first mapping of CSI-RS ports to the set of REs.

Operations 900 continue, at block 904, by the wireless node processing CSI-RSs based on the indicated configuration to determine channel state information. Continuing the example from above, the UE 120 processes (e.g., measures) CSI-RSs based on the indicated configuration (from block 902) to determine channel state information.

At block 906, the UE reports the channel state information to the TRP. Continuing the example from above, the UE 120 reports (e.g., by transmitting a CSI report) the channel state information to the TRP (e.g., BS 110a, shown in FIG. 1).

Control signaling can be used to indicate one symbol (self-contained CSI-RS symbol) or more than 1 symbol with OCC and possibly some combinations of one symbol and two symbols in a slot: for example, for a 7-symbol slot, 3 pairs of CSI-RS symbols plus 1 CSI-RS symbol may be used.

In some cases, configurable orthogonal cover codes (OCC) may be applied in time and/or frequency. The OCC configuration may be indicated via higher-layer signaling (e.g., RRC), L2 signaling (e.g., a MAC CE), L1 signaling (e.g., a DCI) and/or any combination of RRC, L2, or L1 signaling.

In some cases, scalable numerology symbols for 1-symbol CSI-RS may be used to create two virtual symbols, for example, by applying OCC in time (time domain OCC (TD-OCC)). For example, instead of transmitting one OFDM symbol with a first numerology, two OFDM symbols with a second numerology with double subcarrier spacing (SCS) and the same cyclic prefix (CP) overhead are transmitted. These two symbols can carry the CSI-RS using TD-OCC.

The location (in time domain) of CSI-RS may be determined relative to the end of the DL portion, when a self-contained slot is used. For example, if one OFDM symbol with CSI-RS is used, this symbol is implicitly understood that it is the latest (e.g., last) DL symbol in the DL burst. Similarly, if two or more symbols carrying CSI-RS are used, then the last two or more latest symbols of the DL burst are being used for CSI-RS. In this example, data shall not be multiplexed with CSI-RS on the same symbols.

Figure 10:
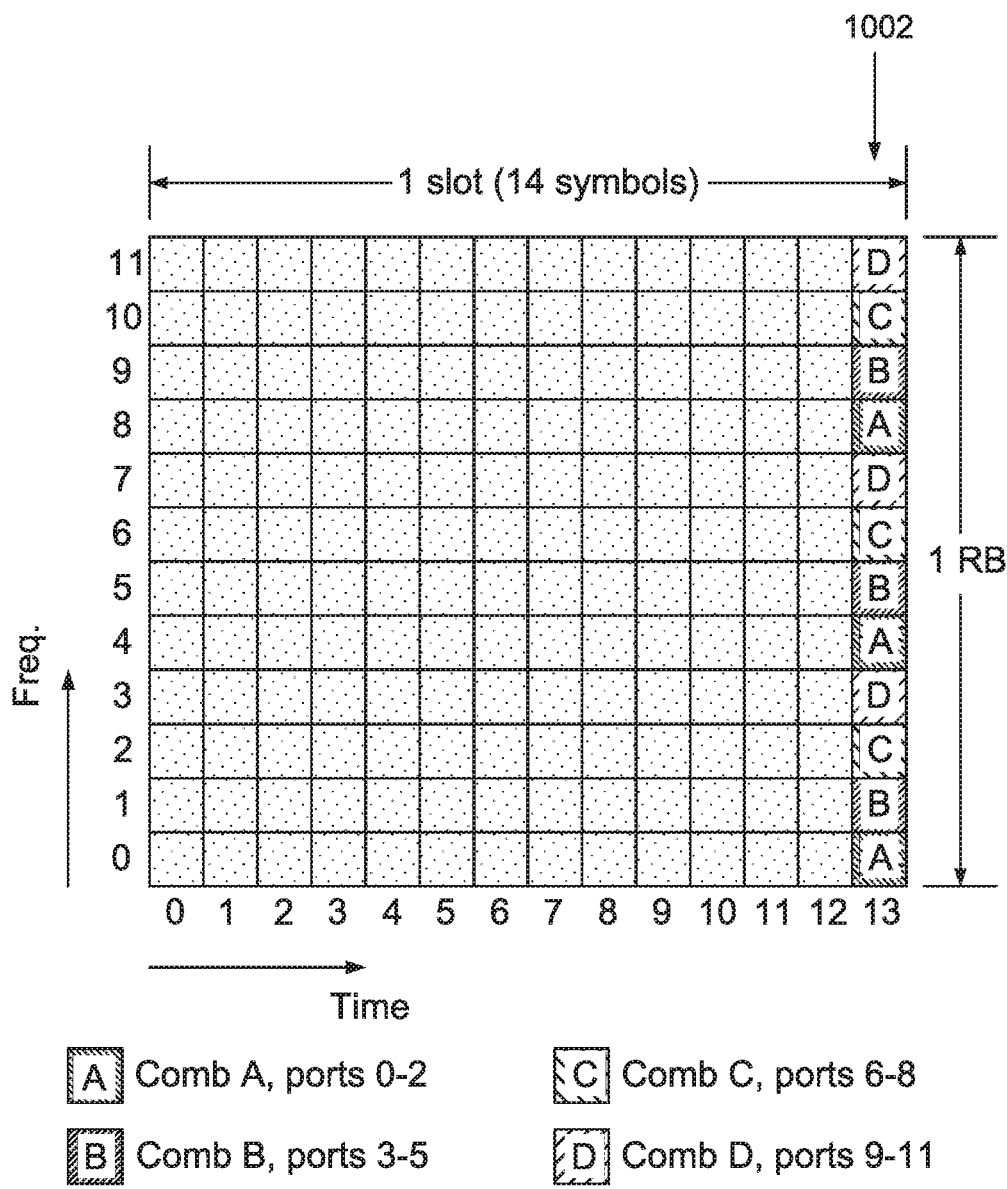
FIG. 10 illustrates an example of transmitting reference symbols, according to aspects of the present disclosure.

As illustrated in FIG. 10, with "1-symbol CSI-RS," a CSI-RS transmission may be self-contained in one OFDM symbol. According to some aspects of the present disclosure, a 1-symbol CSI-RS may be a self-contained CSI-RS transmitted using interleaved frequency division multiplexing (IFDM) and/or code division multiplexing (CDM). As illustrated, the CSI-RS may be transmitted on uniformly distributed REs. The CSI-RS resources correspond to RE groups. Different CSI-RS ports may be separated by using different combs, labeled combs A, B, C, and D and shown at 1002, and/or using different cyclic-shifts of a common root constant amplitude zero autocorrelation (CAZAC) sequence (e.g., a Zadoff-Chu sequence). As illustrated, there are 12 ports. Comb A corresponds to frequencies 0, 4, and 8. Likewise, comb B corresponds to frequencies 1, 5, and 9; comb C corresponds to frequencies 2, 6, and 10; and comb D corresponds to frequencies 3, 7, and 11. A series of discrete, equally spaced elements in a spectrum may be referred to as a frequency comb.

Figure 11A:
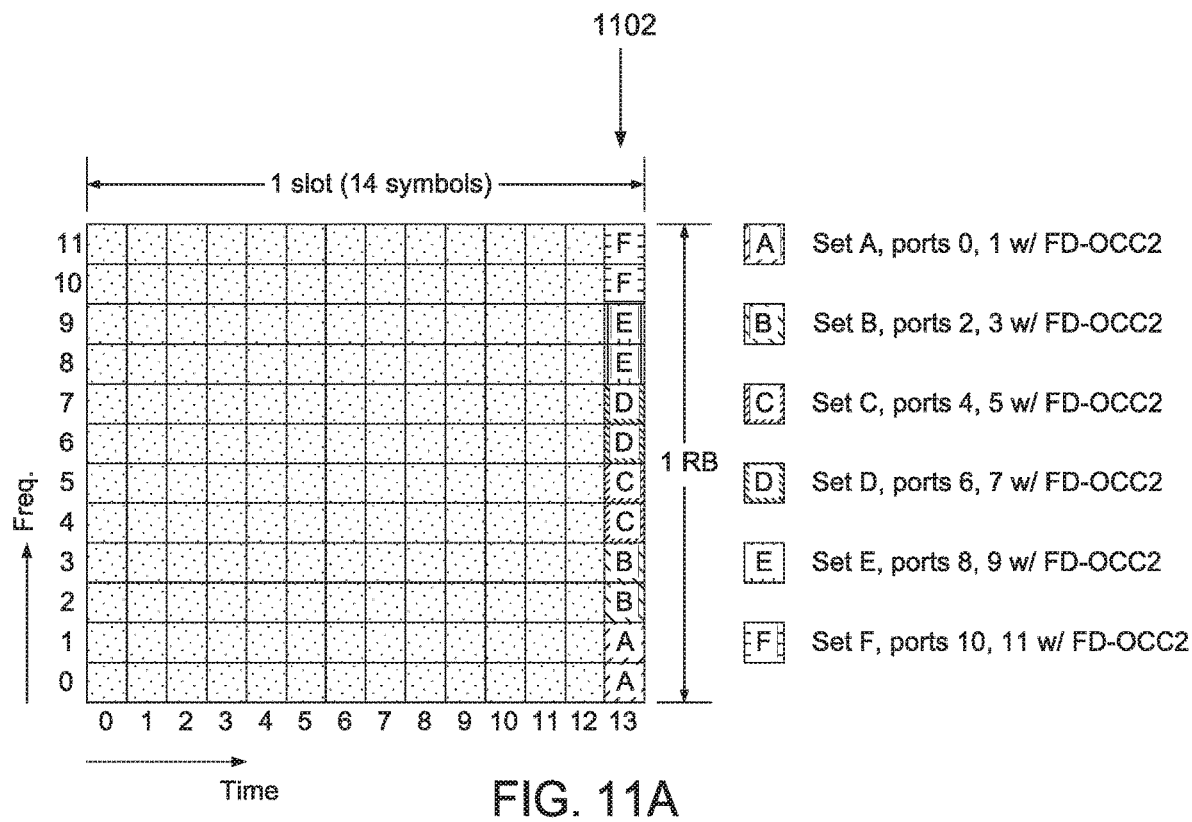
FIGS. 11A & 11B illustrate examples of transmitting reference symbols, according to aspects of the present disclosure.
Figure 11B:
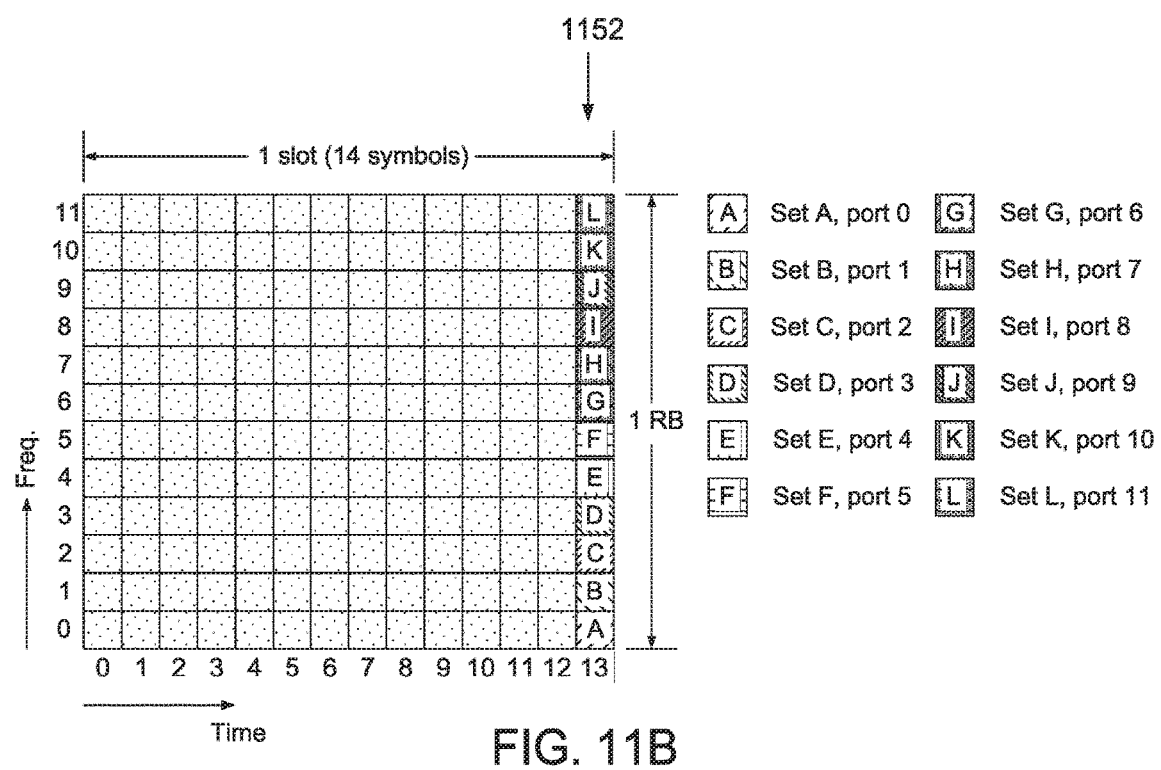

FIGS. 11A and 11B illustrate other examples of 1-symbol CSI-RS transmission with frequency division multiplexing (FDM) and/or frequency division orthogonal cover codes (FD-OCC). As illustrated, the CSI-RS may be transmitted on a set of uniformly distributed RE groups. Each group may comprise two or more localized or distributed REs. Different CSI-RS ports may be separated by different sets of RE groups and further by applying orthogonal cover codes (OCC) to the REs in each group. In FIG. 11A, it can be seen that there are 6 CSI-RS configurations, A-F, with each set (e.g. set A, set B, . . . or set F) of CSI-RS ports being mapped to 2 REs that are located in a same time domain (e.g., OFDM symbol 13) and adjacent each other (e.g., on consecutive subcarriers) in the frequency domain, as shown at 1102. This may result in a stronger correlation of each CSI when combining the CSI-RS resources. Resource configuration set A comprises ports 0 and 1 with size-2 frequency domain orthogonal cover codes (FD-OCC2). Resource configuration set B comprises ports 2 and 3 with FD-OCC2. Resource configuration set C comprises ports 4 and 5 with FD-OCC2. Resource configuration set D comprises ports 6 and 7 with FD-OCC2. Resource configuration set E comprises ports 8 and 9 with FD-OCC2. Resource configuration set F comprises ports 10 and 11 with FD-OCC2. In FIG. 11B, it can be seen that there are 12 CSI-RS configurations at 1152, each CSI-RS resource or port being mapped to 1 RE.

Figure 12A:
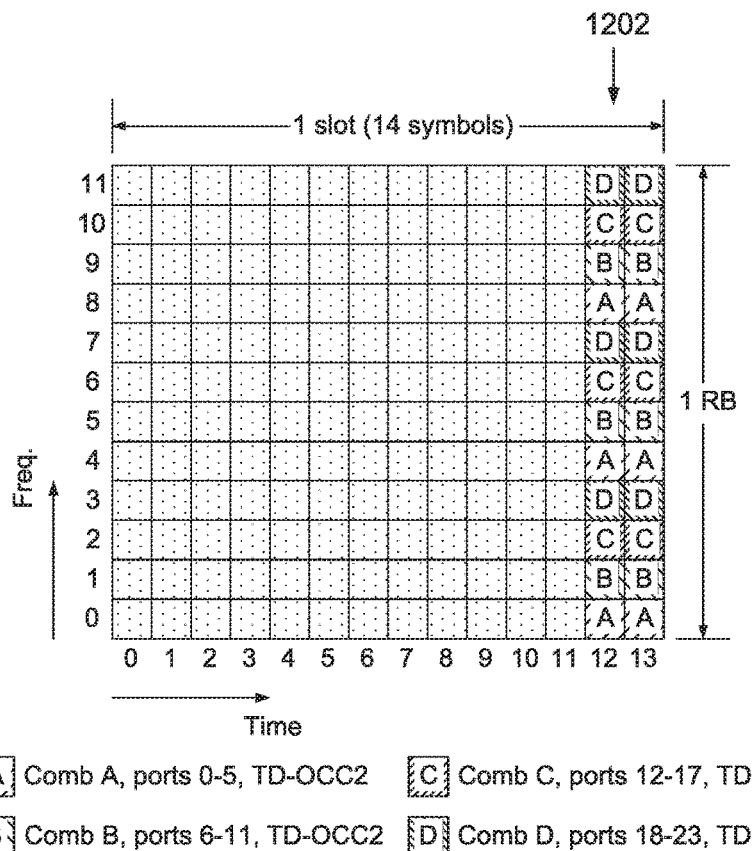
FIGS. 12A & 12B illustrate examples of transmitting reference symbols, according to aspects of the present disclosure.
Figure 12B:
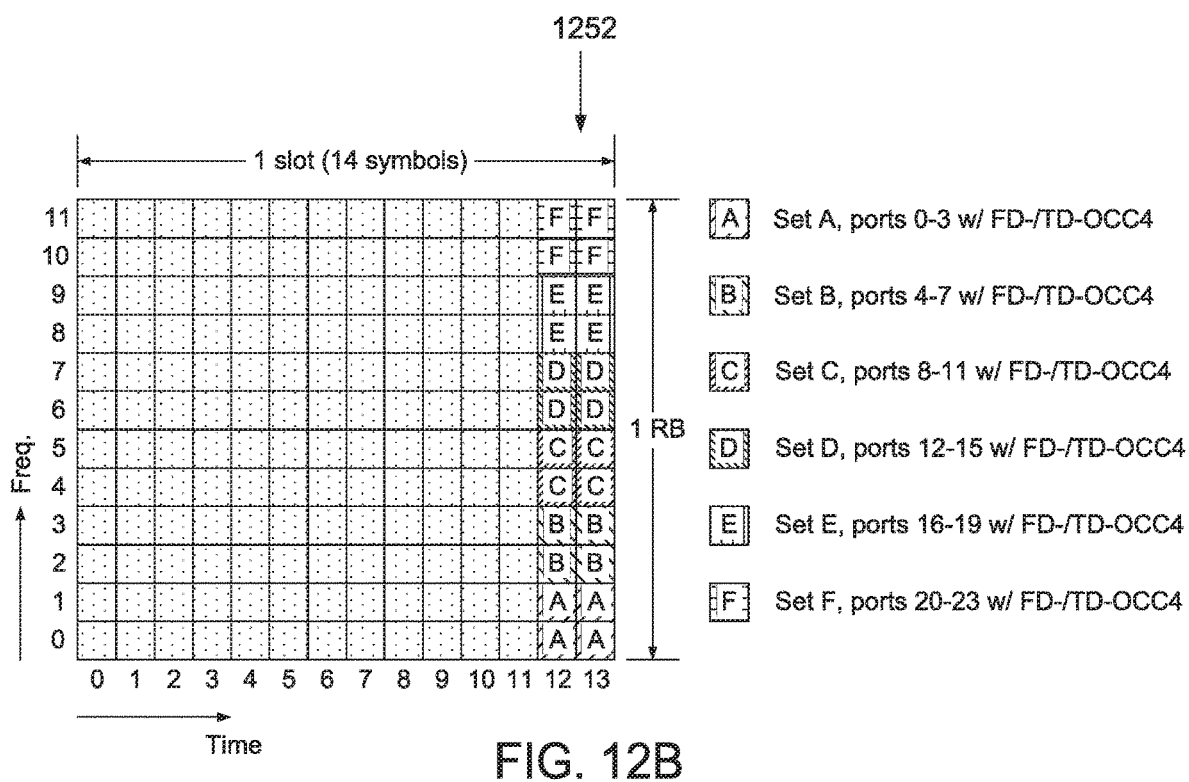

FIGS. 12A and 12B illustrate 2-symbol CSI-RS, with each CSI-RS transmission using a pair of OFDM symbols with TD-OCC, in accordance with aspects of the present disclosure. A UE can be configured to further apply orthogonal cover codes (OCC) to two OFDM symbols. TD-OCC may be configurable for the 2-symbol CSI-RS solution. The configuration can be either signaled using higher-layer signaling (e.g., RRC), L2 signaling (e.g., MAC CE), L1 signaling (e.g., DCI), and/or any combination of higher-layer signaling, L2 signaling, or L1 signaling. FIG. 12A illustrates an example of mapping CSI-RS with IFDM and/or CDM and TD-OCC at 1202. FIG. 12B illustrates an example of mapping CSI-RS with FDM and FD-OCC and/or TD-OCC at 1252.

Figure 13A:
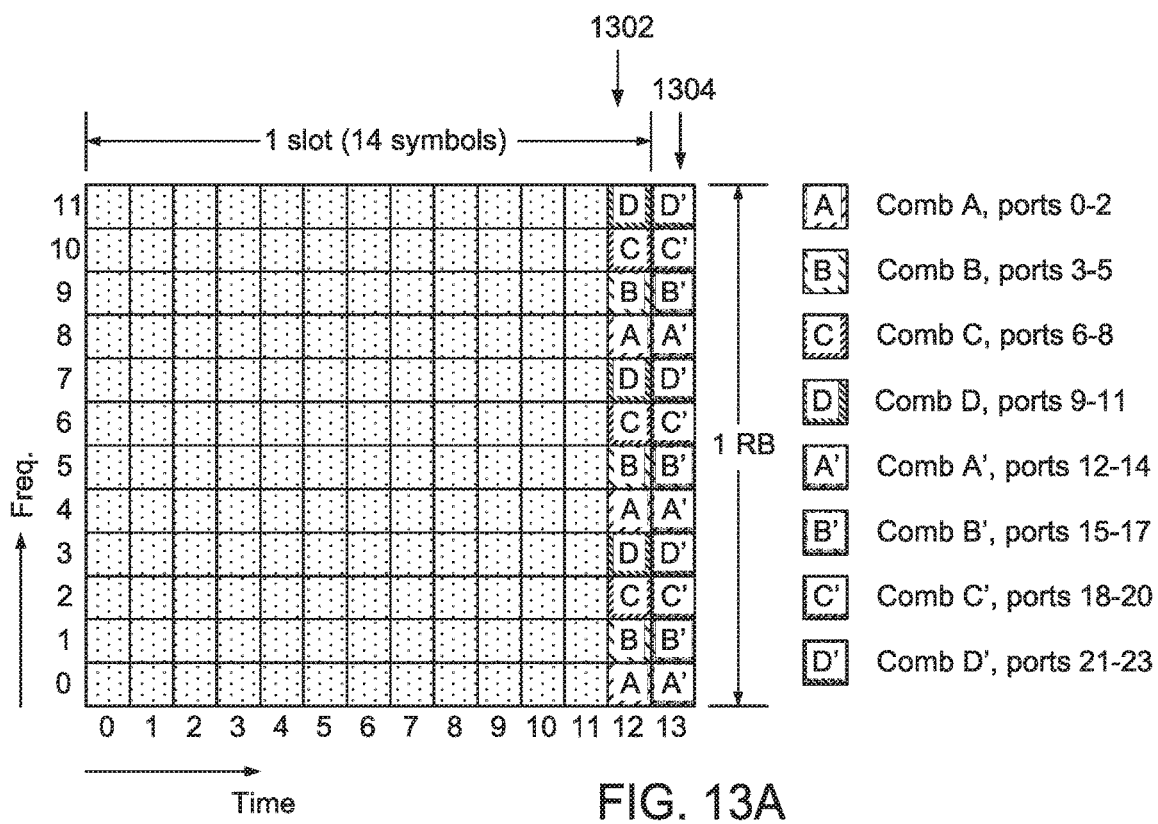
FIGS. 13A & 13B illustrate examples of transmitting reference symbols, according to aspects of the present disclosure.
Figure 13B:
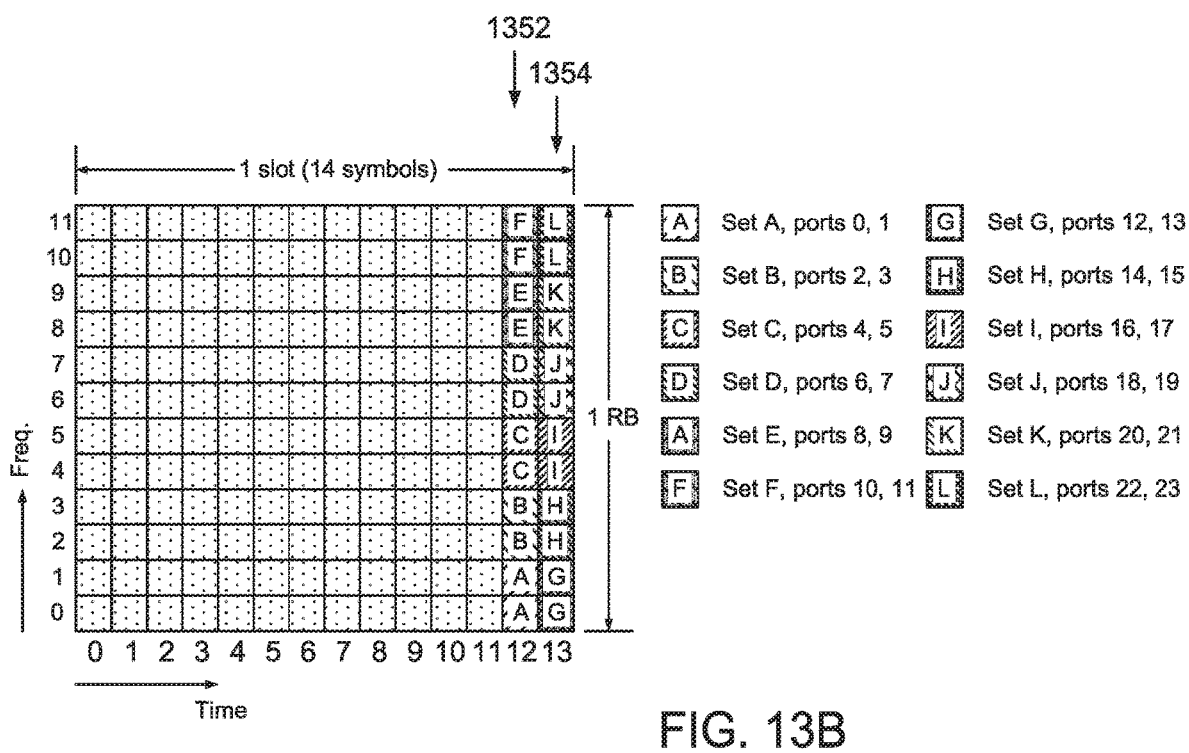

FIGS. 13A and 13B illustrate examples of multiple 1-symbol CSI-RS transmissions in a slot, in accordance with aspects of the present disclosure. A UE may be configured with one or more OFDM symbols for 1-symbol CSI-RS transmission. For example, in case of 24-port CSI-RS, a UE may be configured with CSI-RS transmission on 2 OFDM symbols; one symbol may convey CSI-RS ports 0-11, as shown at 1302, and the other symbol may convey CSI-RS ports 12-23, as shown at 1304. In another example, the ports may be divided into twelve sets of CSI-RS resources, while still having a first symbol convey CSI-RS ports 0-11, as shown at 1352, and another symbol conveying CSI-RS ports 12-23, as shown at 1354.

Figure 14:
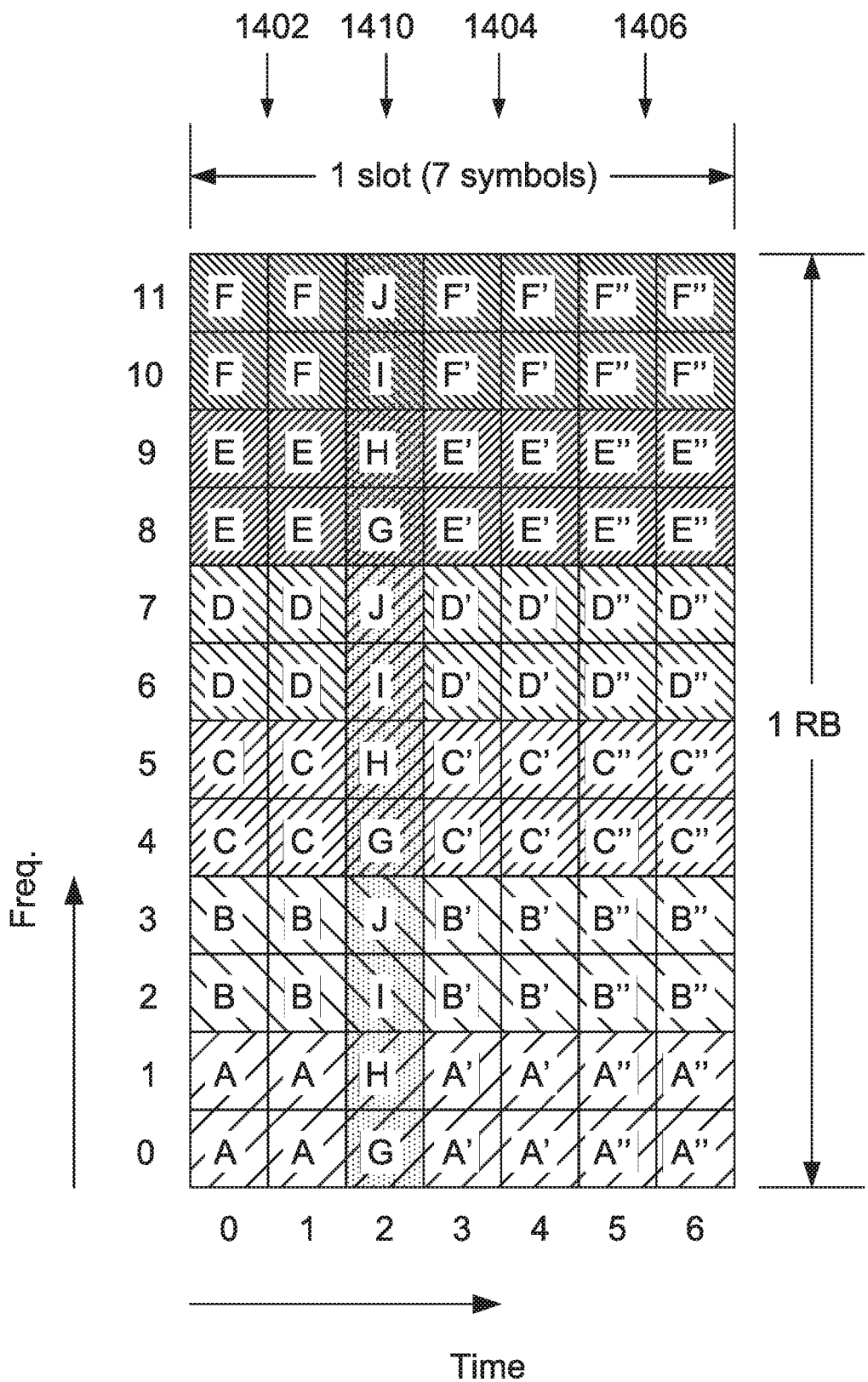
FIG. 14 illustrates an example of transmitting reference symbols, according to aspects of the present disclosure.

FIG. 14 illustrates an example of a combination (e.g., a mix) of 1-symbol and 2-symbol CSI-RSs in a slot. In the illustrated example, a UE may be configured with one or more 1-symbol and/or 2-symbol CSI-RSs. For example, in case of a 7-symbol slot, a UE can be configured w/three 2-symbol CSI-RSs with TD-OCC2, shosn at 1402, 1404, and 1406, and a 1-symbol CSI-RS 1410. The configuration may be signaled using higher-layer signaling (e.g., RRC), L2 signaling (e.g., MAC CE), L1 signaling (e.g., DCI), and/or any combination of higher-layer signaling, L2 signaling, and L1 signaling. The configuration may indicate which symbols are used for 1-symbol CSI-RS and which symbols are used for 2-symbol CSI-RS. A 1-symbol CSI-RS can be virtually split into 2-symbol CSI-RS with TD-OCC2.

When only 1-symbol is available, and TD-OCC is configured, then scaled numerology (double subcarrier spacing with the same CP overhead) may be used to create 2-symbols with double the subcarrier spacing (SCS) and applying TD-OCC.

According to aspects of the present disclosure, similar techniques may be applied for CSI-RS in a mini-slot. A mini-slot is generally the minimum scheduling unit that can be as small as 1 OFDM symbol and up to slot length-1 (e.g., 7−1=6) OFDM symbols. For all cases that the number of available CSI-RS symbols is odd, 1-symbol and 2-symbol CSI-RS designs may be mixed.

Figure 15A:
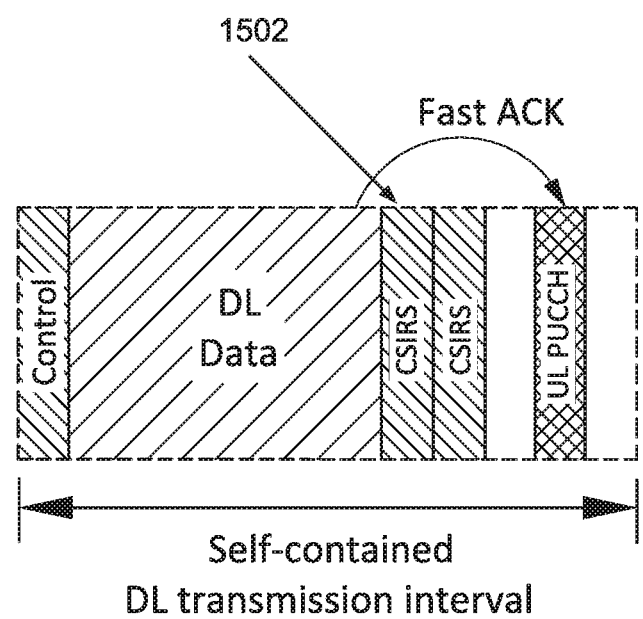
FIG. 15A illustrates an example of CSI-RS location in a self-contained slot, according to aspects of the present disclosure.

FIG. 15A illustrates an example of CSI-RS location in a self-contained slot. For low-latency applications, symbols carrying CSI-RS may be allocated relative to the "end" of the DL part of the slot, as shown at 1502. The same technique may be applied to aggregation of slots or mini-slots. CSI-RS and data may not be frequency division multiplexed in these symbols. If frequency division multiplexing of data and CSI-RS was supported, then data would appear in the last symbols, which would make the timeline processing and the fast-turnaround of the ACK difficult for the UE.

Figure 15B:
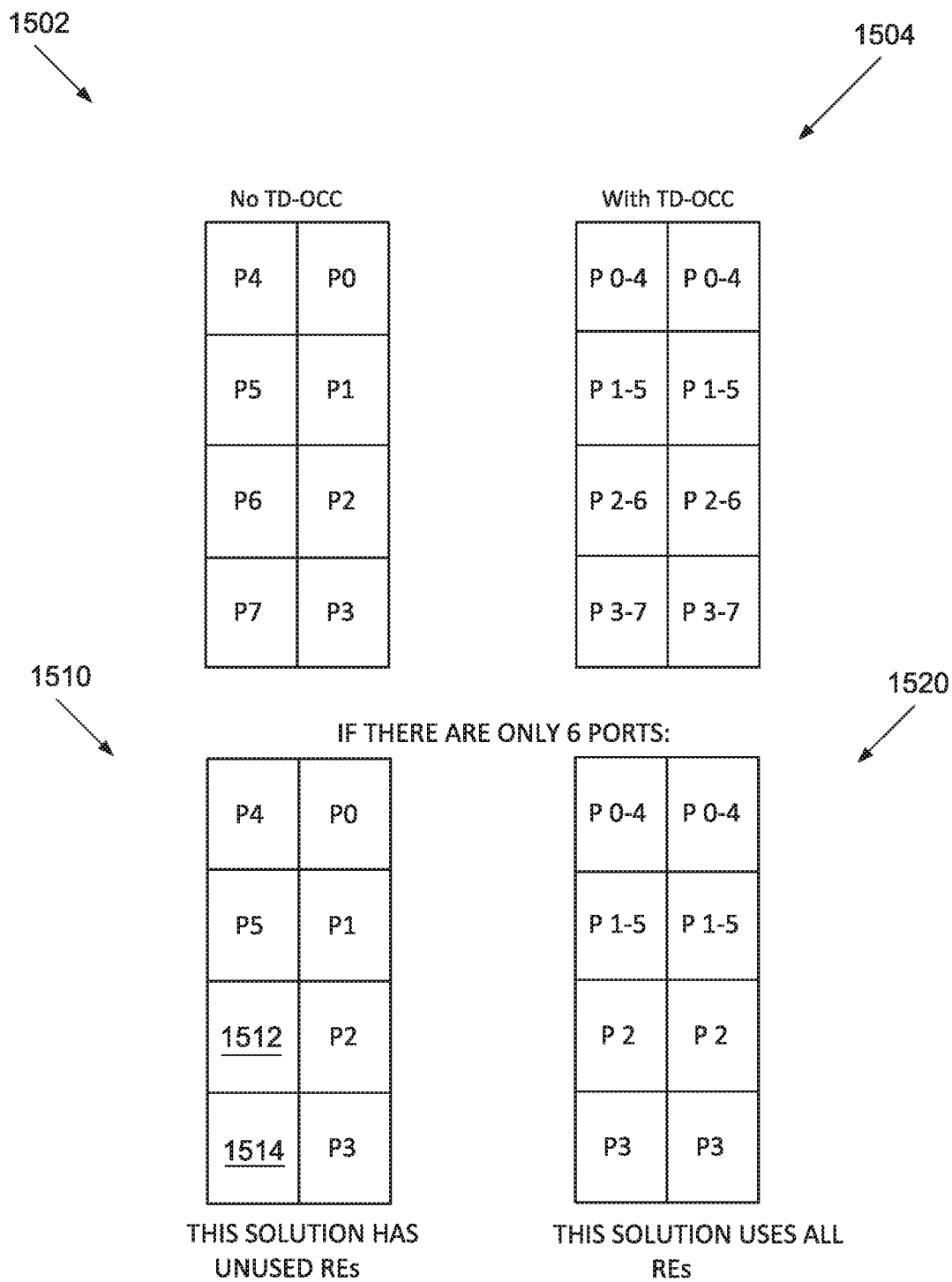
FIG. 15B illustrates examples of using time-division orthogonal cover codes with reference symbols, according to aspects of the present disclosure.

According to aspects of the present disclosure and as illustrated in FIG. 15B, TD-OCC may be used to ensure that no resources are left unused. For example, if 6 ports need to be supported, if no TD-OCC is used, then 4 ports will appear in one symbol, and 2 ports in the other symbol. Then, some resource elements may not be allowed to carry data, and therefore these resources are lost. As shown at 1502 and 1504, eight ports may be supported in a set of eight REs, both without using TD-OCC, as at 1502, and using TD-OCC, as at 1504. If only six ports are to be supported by the same set of eight REs, then two REs remain unused if TD-OCC is not used, because six REs are used for the six CSI-RS and two REs 1512 and 1514 are not needed for CSI-RS, but cannot be used for data transmission (because data and CSI-RS frequency division multiplexing is not supported). However, using TD-OCC with CSI-RS uses all of the REs, as shown at 1520, while allowing a stronger correlation of each CSI when combining the CSI-RS.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station, comprising:
   determining a configuration of channel state information reference signals (CSI-RSs), wherein the configuration indicates a set of resource elements (REs) to be used for CSI-RSs and a first mapping of CSI-RS ports to the set of REs, wherein the configuration further indicates orthogonal cover codes (OCCs) used for transmitting the CSI-RSs,
   wherein the set of REs comprises one or more RE groups, wherein a RE group of the one or more RE groups comprises two or more localized REs within one orthogonal frequency division multiplexing (OFDM) symbol, wherein the two or more localized REs are adjacent to each other in the frequency domain, and
   wherein the mapped CSI-RS ports are separated by the orthogonal cover codes (OCCs) applied to the one or more RE groups in frequency domain only;
   sending an indication of the configuration of the CSI-RSs; and
   transmitting the CSI-RSs according to the determined configuration, wherein the configuration indicates a combination of one OFDM symbol CSI-RSs with a first numerology having a first subcarrier spacing and two OFDM symbols CSI-RSs with a second numerology having a second subcarrier spacing.

2. The method of claim 1, wherein:
   the configuration indicates that the one OFDM symbol CSI-RSs comprises a cyclic prefix (CP) overhead, and
   transmitting the CSI-RSs comprises:
      applying the OCCs in the time domain, and
      transmitting the CSI-RSs using at least two OFDM symbols with the second numerology having the second subcarrier spacing, wherein the second subcarrier spacing is at least double the first subcarrier spacing and the same CP overhead.

3. The method of claim 1, wherein determining the configuration comprises:
   determining a plurality of REs to be used for a downlink transmission to a receiver; and
   selecting a group of REs, which are latest in time REs of the plurality of REs, for the set of REs to be used for the CSI-RSs.

4. The method of claim 3, wherein data signals are not allowed to be multiplexed on the group of the latest REs.

5. The method of claim 3, further comprising:
   receiving an acknowledgment (ACK) or a negative acknowledgment (NAK), of the data transmitted in the downlink transmission in a slot, mini-slot, or set of aggregated slots, in an uplink portion located in the end of the same slot, mini-slot, or set of aggregated slots.

6. The method according to claim 1, wherein transmitting the CSI-RSs comprises transmitting the CSI-RSs on uniformly distributed REs in one orthogonal frequency domain multiplexing (OFDM) symbol.

7. The method of claim 1, wherein transmitting the CSI-RSs comprises transmitting the CSI-RSs on REs having one frequency and uniformly distributed over time.

8. The method of claim 1, further comprising:
   signaling the configuration using at least one of radio resource control (RRC) signaling, layer 2 (L2) signaling, or layer 1 (L1) signaling.

9. A method for wireless communications by a user equipment, comprising:
   receiving an indication of a configuration of channel state information reference signals (CSI-RSs) from a transmission reception point (TRP), wherein the configuration indicates a set of resource elements (REs) to be used for CSI-RSs and a first mapping of CSI-RS ports to the set of REs, wherein the configuration further indicates orthogonal cover codes (OCCs) used for transmitting the CSI-RSs,
   wherein the set of REs comprises one or more RE groups, wherein a RE group of the one or more RE groups comprises two or more localized REs within one orthogonal frequency division multiplexing (OFDM) symbol, wherein the two or more localized REs are adjacent to each other in the frequency domain, and
   wherein the mapped CSI-RS ports are separated by orthogonal cover codes (OCCs) applied to the one or more RE groups in frequency domain only;
   processing CSI-RSs based on the indicated configuration to determine channel state information, wherein the configuration indicates a combination of one OFDM symbol CSI-RSs with a first numerology having a first subcarrier spacing and two OFDM symbols CSI-RSs with a second numerology having a second subcarrier spacing; and
   reporting the channel state information to the TRP.

10. The method of claim 9, wherein the configuration further indicates the orthogonal cover codes (OCCs) used for transmitting the CSI-RSs.

11. The method of claim 10, wherein:
    the configuration indicates the one OFDM symbol CSI-RSs comprises a cyclic prefix (CP) overhead, and
    processing the CSI-RSs comprises:
       applying the OCCs in the time domain, and
       receiving the CSI-RSs using at least two OFDM symbols with the second numerology having the second subcarrier spacing, wherein the second subcarrier spacing that is at least double the first subcarrier spacing and the same CP overhead.

12. The method of claim 9, wherein the configuration:
    specifies a group of REs that are latest REs of a set of REs used for a downlink transmission to the receiver.

13. The method of claim 12, wherein data signals are not allowed to be multiplexed on the group of the latest REs.

14. The method of claim 12, further comprising:
reporting an acknowledgment (ACK) or a negative acknowledgment (NAK), of the data transmitted on the downlink transmission in a slot, mini-slot, or set of aggregated slots, in an uplink portion located in the end of the same slot, mini-slot, or set of aggregated slots.

15. The method according to claim 9, wherein processing the CSI-RSs comprises receiving the CSI-RSs on uniformly distributed REs in one orthogonal frequency domain multiplexing (OFDM) symbol.

16. The method of claim 9, wherein processing the CSI-RSs comprises receiving the CSI-RSs on REs having one frequency and uniformly distributed over time.

17. The method of claim 9, further comprising:
receiving the configuration using at least one of radio resource control (RRC) signaling, layer 2 (L2) signaling, or layer 1 (L1) signaling.

18. An apparatus for wireless communications in a base station, comprising:
a processor configured to:
determine a configuration of channel state information reference signals (CSI-RSs), wherein the configuration indicates a set of resource elements (REs) to be used for CSI-RSs and a first mapping of CSI-RS ports to the set of REs, wherein the configuration further indicates the orthogonal cover codes (OCCs) used for transmitting the CSI-RSs,
wherein the set of REs comprises one or more RE groups, wherein a RE group of the one or more RE groups comprises two or more localized REs within one orthogonal frequency division multiplexing (OFDM) symbol, wherein the two or more localized REs are adjacent to each other in the frequency domain, and
wherein the mapped CSI-RS ports are separated by orthogonal cover codes (OCCs) applied to the one or more RE groups in frequency domain only;
send an indication of the configuration of the CSI-RSs; and
transmit the CSI-RSs according to the determined configuration, wherein the configuration indicates a combination of one OFDM symbol CSI-RSs with a first numerology having a first subcarrier spacing and two OFDM symbols CSI-RSs with a second numerology having a second subcarrier spacing; and
a memory coupled with the processor.

19. The apparatus of claim 18, wherein the processor is configured to transmit the CSI-RSs by transmitting the CSI-RSs on uniformly distributed REs in one orthogonal frequency domain multiplexing (OFDM) symbol.

20. The apparatus of claim 18, wherein the processor is configured to transmit the CSI-RSs by transmitting the CSI-RSs on REs having one frequency and uniformly distributed over time.

21. An apparatus for wireless communications in a user equipment, comprising:
a processor configured to:
receive an indication of a configuration of channel state information reference signals (CSI-RSs) from a transmission reception point (TRP), wherein the configuration indicates a set of resource elements (REs) to be used for CSI-RSs and a first mapping of CSI-RS ports to the set of REs, wherein the configuration further indicates the orthogonal cover codes (OCCs) used for transmitting the CSI-RSs,
wherein the set of REs comprises one or more RE groups, wherein a RE group of the one or more RE groups comprises two or more localized REs within one orthogonal frequency division multiplexing (OFDM) symbol, wherein the two or more localized REs are adjacent to each other in the frequency domain, and
wherein the mapped CSI-RS ports are separated by orthogonal cover codes (OCCs) applied to the one or more RE groups in frequency domain only;
process CSI-RSs based on the indicated configuration to determine channel state information, wherein the configuration indicates a combination of one OFDM symbol CSI-RSs with a first numerology having a first subcarrier spacing and two OFDM symbols CSI-RSs with a second numerology having a second subcarrier spacing; and
report the channel state information to the TRP; and
a memory coupled with the processor.

22. The apparatus of claim 21, wherein:
the configuration further indicates the orthogonal cover codes (OCCs) used for transmitting the CSI-RSs; and
the processor is configured to process the CSI-RSs based on the OCCs.

23. The apparatus of claim 22, wherein:
the configuration indicates the one OFDM symbol CSI-RSs comprises a cyclic prefix (CP) overhead, and
the processor is configured to process the CSI-RSs by:
applying the OCCs in the time domain, and
receiving the CSI-RSs using at least two OFDM symbols with the second numerology, wherein the second subcarrier spacing that is at least double the first subcarrier spacing and the same CP overhead.

24. The apparatus of claim 23, wherein:
the configuration specifies a group of REs that are latest REs of a set of REs used for a downlink transmission to the apparatus; and
the processor is configured to process the CSI-RSs by processing the CSI-RSs in the group of the latest REs.

25. The apparatus of claim 24, wherein data signals are not allowed to be multiplexed on the group of the latest REs.

26. The apparatus of claim 24, wherein the processor is configured to:
report an acknowledgment (ACK) or a negative acknowledgment (NAK), of the data transmitted on the downlink transmission in a slot, mini-slot, or set of aggregated slots, in an uplink portion located in the end of the same slot, mini-slot, or set of aggregated slots.

27. The apparatus of claim 21, wherein the processor is configured to process the CSI-RSs by receiving the CSI-RSs on uniformly distributed REs in one orthogonal frequency domain multiplexing (OFDM) symbol.

28. The apparatus of claim 21, wherein the processor is configured to process the CSI-RSs by receiving the CSI-RSs on REs having one frequency and uniformly distributed over time.

29. The apparatus of claim 21, wherein the processor is configured to:
receive the configuration using at least one of radio resource control (RRC) signaling, layer 2 (L2) signaling, or layer 1 (L1) signaling.

* * * * *